United States Patent [19]

Taylor et al.

[11] Patent Number: 4,995,851
[45] Date of Patent: Feb. 26, 1991

[54] SPRING STEEL TENSIONER

[75] Inventors: Dennis E. Taylor, Kewanee, Ill.;
Larry J. Goldbeck, Comanche, Iowa

[73] Assignee: Martin Engineering Company, Neponset, Ill.

[21] Appl. No.: 561,969

[22] Filed: Aug. 2, 1990

[51] Int. Cl.$^5$ .............................................. F16H 7/08
[52] U.S. Cl. .................................... 474/101; 198/499; 464/88
[58] Field of Search ................. 474/101, 109–111, 474/113–117, 133, 135, 136, 138; 198/497, 499; 403/223; 464/88

[56] References Cited

U.S. PATENT DOCUMENTS 2,867,103  1/1959  Williams .............................. 464/88
4,290,520  9/1981  Rhodes ................................. 198/499

Primary Examiner—Thuy M. Bui
Attorney, Agent, or Firm—Lee, Mann, Smith, McWilliams & Sweeney

[57] ABSTRACT

A tensioning device is provided for selecting and imparting torsional bias to a shaft and simultaneously providing a shock absorbing mechanism, the device including a biasing disposed substantially within the shaft for imparting torsional bias to the shaft, a coupler rotationally fixing one end of the biasing strip to the shaft, and a hub member rotationally fixed to the other end of the biasing strip, the hub member being relatively rotatable with respect to the shaft and including a locking mechanism to lock the hub member to a stationary frame member when the desired torque has been reached.

6 Claims, 2 Drawing Sheets

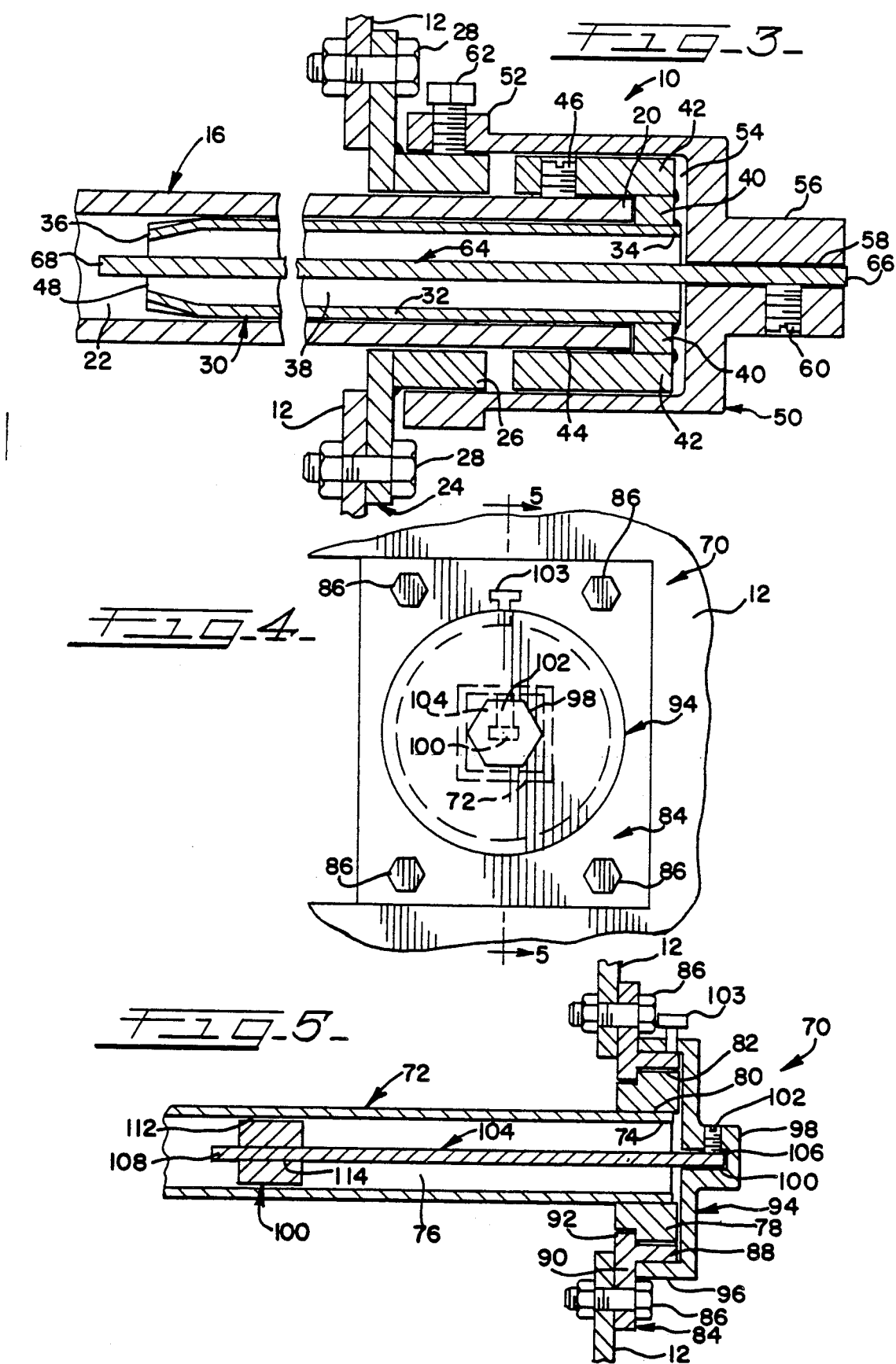

SPRING STEEL TENSIONER

BACKGROUND OF THE INVENTION

The present invention relates to a tensioning device which is used to select and impart a moment of torque to an attached member such as a shaft, and which will bias the attached member to maintain contact between the attached member and a second member. The present torsional tensioning device has been found to be particularly useful in connection with conveyor belt cleaners which utilize scraper blades to clean the conveyor belt. Conveyor belt scraper blades are conventionally mounted on a shaft which is transverse to the direction of conveyor belt travel. When the shaft is rotated the blades are forced into contact with the belt to scrape off adherent material. Over time the scraper blades wear and lose contact with the belt thereby hampering the blades cleaning ability. The shaft on which the scraper blades are mounted must then be rotated to reposition the scraper blades against the belt.

Conveyor belt scraper blades are subjected to repeated impact forces which are generated by the blades coming into contact with conveyor belt splices and enlarged pieces of the conveyed material or debris which adheres to the belt, all of which can cause appreciable damage to the scraper blades or the conveyor mechanism. To promote effective cleaning of the conveyor belt and to avoid shutting the belt down for repair, it is of the utmost importance to provide the scraper blades with a shock absorbing capability.

Previous torsional tensioning devices of the types shown in U.S. Pat. Nos. 4,925,434 and 4,533,036 have been used in connection with conveyor belt scraper blades. In these devices the biasing means extends outward from the end of the conveyor belt cleaner shaft and away from the conveyor chute. Changes in length of the biasing means in these devices will affect the amount of clearance available on the outside of the conveyor mechanism along walkways and the like. These prior devices also leave the biasing means exposed, subjecting the biasing means to possible cutting or tearing from foreign objects. Torsional springs used for mounting a conveyor belt cleaner to a shaft are shown in U.S. Pat. Nos. 3,674,131 and 4,533,035. A torsion spring is also shown in U.S. Pat. No. 4,171,920.

SUMMARY OF THE INVENTION

The present invention provides a torsional tensioning device which is particularly useful in biasing conveyor belt scraper blades into contact with a conveyor belt. The scraper blades are connected to a rotatable shaft. A moment of torque is applied to the shaft through a biasing strip of spring steel which extends substantially within the shaft. The strip is coupled at one end to the shaft and at the other end to a rotatable hub which is selectively connectable to a fixed mounting frame. The torsional resistance, the resistance to rotation or twisting, of the biasing strip can be adjusted by changing the distance between the points at which the hub is connected to the strip and at which the shaft is coupled to the strip, or by changing the length or cross sectional dimensions of the strip. Adjustments to the torsional resistance of the tensioning device will not affect the amount of clearance in adjacent areas. An infinite range of torques may be selected and applied to the shaft by rotating the hub about the mounting frame in the angular amount desired and then securing the rotated hub to the mounting frame. The biasing strip also provides a shock absorbing mechanism for the scraper blades.

DESCRIPTION OF THE DRAWINGS

FIG. 3 is a cross sectional view of the first embodiment of the spring steel tensioning device taken along lines 3—3 of FIG. 2.

FIG. 4 is an end elevational view of a second embodiment of the spring steel tensioning device.

FIG. 5 is a cross sectional view of the second embodiment of the spring steel tensioning device taken along lines 5—5 of FIG. 4.

DESCRIPTION OF THE PREFERRED EMBODIMENT

Figure 1:
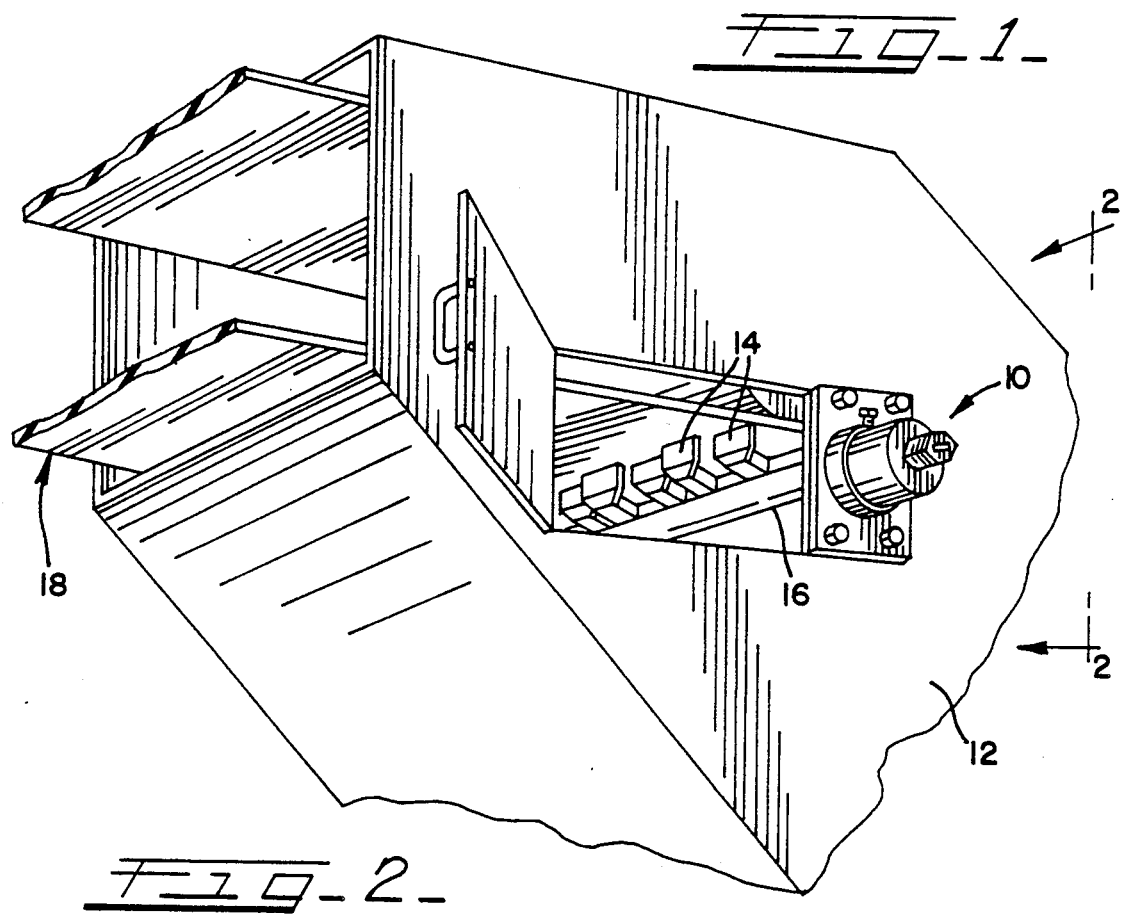
FIG. 1 is a perspective view of a first embodiment of the spring steel tensioning device shown installed in a conveyor chute.
Figure 2:
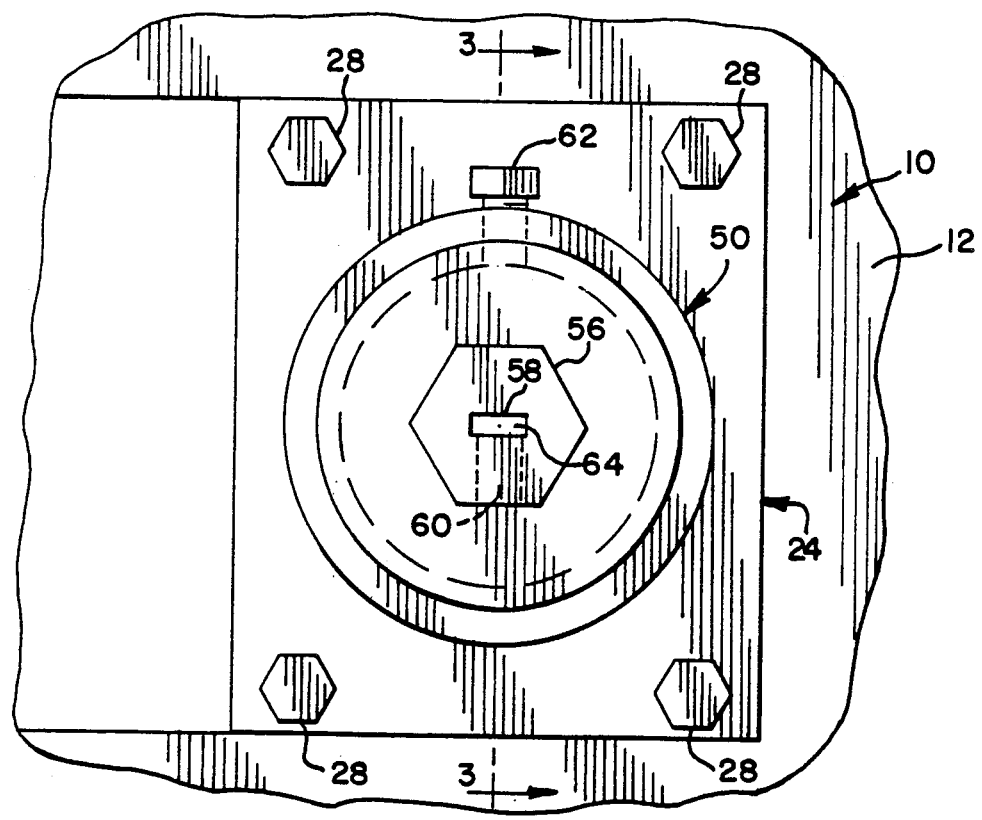
FIG. 2 is an end elevational view of the first embodiment of the spring steel tensioning device taken along lines 2—2 of FIG. 1.

FIG. 1 illustrates the spring steel torsional tensioning device 10 fastened to a conveyor chute 12. A plurality of scraper blades 14 are removably secured to a shaft 16 which extends transversely to the conveyor belt 18 as illustrated and described in U.S. Pat. No. 4,643,293 owned by Martin Engineering Company. The scraper blades 14 may be moved into or out of scraping engagement with the conveyor belt 18 by the appropriate rotation of the shaft 16.

As best shown in FIG. 3, the tensioning device 10 is used in connection with the hollow shaft 16 which is circular in cross section. The shaft 16 extends between a first end 20 and a second end not shown. A circular bore 22 extends from the first end 20 of the shaft 16 along the longitudinal axis of the shaft. The bore 22 need not extend the entire length of the shaft 16, but only a sufficient distance from the first end 20 to accommodate the tensioning device 10. The shaft 16 is rotatable within a mounting frame 24 which includes a circular collar 26. The mounting frame 24 is fastened to the conveyor chute 12 with fasteners 28.

A coupler assembly 30 includes a tube 32 preferably of circular configuration having a first end 34 and a second end 36. A bore 38 extends through the tube 32. A circular collar 40 is connected to and extends around the perimeter of the tube 32 at the first end 34. A circular flange 42 extends around and is connected to the collar 40. The flange 42 extends from the collar 40 towards the second end 36 of the tube 32 creating an annular chamber 44 between the flange 42 and the tube 32. A set screw 46 is threadably attached to the flange 42 in such a manner that it may be extended into engagement with the first end 20 of the shaft 16. The second end 36 of the tube 32 is crimped to provide a non-circular aperture 48. Other means for creating the non-circular aperture 48 may also be used, such as by the attachment of a plate to the second end 36 which includes a non-circular aperture.

A hub 50 includes a flange 52 which is adapted to overlie the collar 26 of the mounting frame 24. The hub 50 includes a chamber 54 for receiving the flange 42 of the coupler assembly 30. The hub 50 also includes a hexagonal end 56 which includes an aperture 58 and a set screw 60. The hexagonal end 56 facilitates rotation of the hub 50 by a wrench or ratchet tool. The aperture 58 extends from the chamber 54 through the hexagonal end 56. However, the aperture 58 may extend from the chamber 54 and only partially through the hexagonal end 56 to a distance just past the set screw 60. A fastener 62 is threadably engaged to the flange 52 of the hub 50 to selectively connect the hub 50 to the collar 26 of the mounting frame 24, fixing the hub 50 against rotation.

A rectangular biasing strip 64 includes a first end 66 and a second end 68. The first end 66 is inserted into the aperture 58 of the hub 50 and is connected thereto with set screw 60. The second end 68 of the biasing strip 64 extends through the aperture 48 in the second end 36 of the tube 32. The aperture 48 in the tube 32 prevents rotation of the biasing strip 64 within the aperture 48 so that the biasing strip 64 is rotationally coupled to the tube 32 for conjoint rotation. The biasing strip 64 is preferably made of a rectangular bar of spring steel however other materials and other cross-sectional shapes may be used as desired.

The length of the biasing strip 64 and of the tube 32 may be varied so that the biasing strip 64 will provide different amounts of torsional resistance to rotation or twisting about the longitudinal axis of the strip 64. For example, shortening the tube 32 of the coupler assembly 30 will increase the torsional resistance to rotation of the biasing strip 64. Alternately, lengthening the tube 32, and if necessary lengthening the strip 64 to enable the biasing strip 64 to continue to extend through the aperture 48, will decrease the amount of torsional resistance to rotation provided by the biasing strip 64. The torsional resistance of the biasing strip 64 may also be varied by altering its cross sectional dimensions as well as by utilizing different materials.

In operation, the tube 32 of the connector assembly 30 is inserted into the bore 22 at the first end 20 of the shaft 16. The chamber 44 of the coupler assembly 30 is sized to receive the first end 20 of the shaft 16. The tube 32 is inserted into the shaft 16 until the first end 20 of shaft 16 fills the chamber 44 created between the flange 42 and the tube 32 of the coupler assembly 30. The set screw 46 is then tightened to secure the coupler assembly 30 to the shaft 16. The first end 66 of the biasing strip 64 is inserted into the aperture 58 of the hub 50 and is fastened thereto by the set screw 60. The biasing strip 64 is then inserted into the bore 38 of the tube 32 until the second end 68 extends through the aperture 48 in the tube 32 and the flange 52 overlies the collar 26 of the mounting frame 24. The hub 50 is then secured in place over the collar 26 by tightening the fastener 62.

In order to bias the scraper blades 14 into engagement with the conveyor belt 18, the fastener 62 is loosened. A common wrench or socket wrench may be used to rotate the hexagonal end 56 of the hub 50 which in turn rotates the biasing strip 64, the coupler assembly 30, and the shaft 16 until the scraper blades 14 come into contact with the conveyor belt 18. The hub 50 is rotated to produce the desired moment of torque which urges the scraping blades 14 against the conveyor belt 18 with the desired amount of force. As the hub 50 is rotated with no corresponding rotation of the coupler assembly 30 or the shaft 16, the biasing strip 64 is twisted creating a torsional biasing moment which is stored in the biasing strip 64 and which is applied to the shaft 16. When the desired amount of torsional bias has been produced in the biasing strip 64, the fastener 62 is tightened against the collar 26 of the mounting frame 24, thereby fixing the hub 50 against rotation and connecting the hub 50 to the mounting frame 24. It should be noted that the tensioner 10 is capable of creating a clockwise or counterclockwise torsional biasing moment relative to the longitudinal axis of the biasing strip 64 through the appropriate rotation of the hub 50.

As the scraper blades 14 wear, the biasing strip 64 will begin to untwist thereby causing the shaft 16 to further rotate so that the scraper blades 14 will remain in contact with the conveyor belt 18. The shaft 16 will continue to rotate as the blades wear until the biasing strip 64 returns to its original non-biased or untwisted position. The biasing strip 64, in either a twisted or untwisted condition, will absorb any rotational forces or shocks that are transmitted to the shaft 16 by the scraper blades 14 thereby preventing damage to the conveyor belt cleaner mechanism.

FIGS. 4 and 5 show a tensioning device 70 which is a modified embodiment of the present invention. While the tensioning device 10 is intended to operate with a shaft 16 having a circular bore 22, the tensioning device 70 is intended to operate with a shaft 72 having a non-circular bore. The shaft 72 is preferably rectangular and includes a first end 74 and a second end not shown. The shaft 72 is rectangular in cross section and includes a rectangular bore 76 which extends from the first end 74 of the shaft 72. The bore 76 need not extend completely through the shaft 72 but must accommodate the tensioning device 70. An adapter 78 is fitted around the exterior of the first end 74 of the shaft 72. The adapter 78 includes a central aperture 80 adapted to fit the cross sectional shape of the shaft 72. The adapter 78 also includes a circular outer wall 82. The shaft 72 and the adapter 78 freely rotate within a mounting frame 84. The mounting frame 84 is attached to the chute 12 with fasteners 86 and includes a circular collar 88 and a flange 90 which extends inwardly of the collar 88 to define a lip 92. The lip 92 fits within a recessed portion of the adapter 78 to prevent the adapter 78 from moving along the shaft 72 to the interior of the conveyor chute 12.

A hub 94 includes a flange 96 which overlies the collar 88 of the mounting frame 84. The hub 94 also includes a hexagonal end 98 having an aperture 100 and a set screw 102. A fastener 103 is threadably attached to the flange 96 of the hub 94 which is capable of rotationally locking the hub 94 to the mounting frame 84.

A biasing strip 104 extends between a first end 106 and a second end 108. The first end 106 of the biasing strip 104 is inserted into the aperture 100 of the hub 94 and is fastened thereto with the set screw 102. A coupler block 110 is connected to the biasing strip 104 within the bore 76 of the shaft 72. The coupler block 110 includes an outer wall 112 which is adapted to fit the configuration of the bore 76 and a central aperture 14 which is adapted to securely fit around the biasing strip 104. The coupler block 110 rotationally couples the biasing strip 104 to the shaft 72 for conjoint rotation. The coupler block 110 may be permanently press fit to the second end 108 of the biasing strip 104 or the coupler block 110 may be capable of being positioned at various locations along the biasing strip 104. The coupler block 110 may include means such as a set screw to provide releasable securement to the biasing strip 104. The amount of torsional resistance provided by the biasing strip 104 may be adjusted by positioning the coupler block 110 at different locations along the biasing strip 104. While the biasing strip 104 is preferably made of spring steel, other materials may be used. The cross sectional dimensions or the length of the biasing strip 104 may be also be varied to adjust the torsional resistance provided by the biasing strip 104.

In order to bias the scraper blades 14 into engagement with the conveyor belt 18, the set screw 103 is loosened. A common wrench or a socket wrench may be used to rotate the hexagonal end 98 which in turn rotates the biasing strip 104, the coupler block 110, and the shaft 72 until the scraper blades 14 come into contact with the conveyor belt 18. The hexagonal end 98 is then further rotated to produce the desired moment of torque which urges the scraper blades 14 against the conveyor belt 18 with the desired amount of force. As the hub 94 is rotated with no corresponding rotation of the shaft 72 or the coupler block 110, the biasing strip 104 is twisted creating a torsional biasing moment which is stored in the biasing strip 104 and which is applied to the shaft 72. When the desired amount of torsional bias has been produced in the biasing strip 104, the fastener 103 is tightened against the collar 88 of the mounting frame 84 thereby fixing the hub 94 against rotation and connecting the hub 94 to the mounting frame 84. It should be noted that the tensioner 70 is capable of creating a clockwise or counterclockwise torsional biasing moment relative to the longitudinal axis of the biasing strip 104 through the appropriate rotation of the hub 94.

As the scraper blades 14 wear down, the biasing strip 104 will begin to untwist thereby causing the shaft 72 to rotate so that the scraper blades 14 will remain in contact with conveyor belt 18. The shaft 72 will continue to rotate as the blades wear until the biasing strip 104 returns to its original non-biased or untwisted position. The biasing strip 104, in either a twisted or untwisted condition, will absorb any rotational forces or shocks that are transmitted to the shaft 72 by the scraper blades 14 thereby preventing damage to the conveyor belt scraper mechanism.

The tensioners 10 and 70 are designed to be retrofit on existing conveyor belt cleaner shafts 16 and 72. The tensioners 10 and 70 may be used to replace an existing tensioner which has proven to be unsatisfactory or otherwise in need of replacement. The tensioners 10 and 70 may also be added to existing conveyor belt cleaner shafts which previously were not provided with a tensioner. Of course the tensioners 10 and 70 may also be supplied as original equipment with a conveyor belt cleaner mechanism. The tensioners 10 and 70 permit quick and easy installation of a tensioner to an existing cleaner shaft without requiring any major modifications to the existing equipment.

Various features of the invention have been particularly shown and described in connection with the illustrated embodiments of the invention, however, it must be understood that these particular arrangements only illustrate and that the invention is to be given its fullest interpretation within the terms of the appended claims.

What is claimed is:

1. A tensioning arrangement for imparting torsional bias to a support shaft rotatable within a fixed frame including biasing means adapted to extend into the shaft for imparting torsional bias thereto, said biasing means having a first end, means for coupling said biasing means and the shaft for conjoint rotation, a hub member connectable to said first end of said biasing means, said hub member being relatively rotatable with respect to the fixed frame such that rotation of said hub member is operative to impart a torsional biasing force on the shaft, and fastening means for selectively connecting said hub member to the fixed frame after a torsional biasing force is imparted to said shaft.

2. The tensioning arrangement of claim 1 wherein the torsional biasing force applied to the shaft is adjustable by varying the distance from the end of the shaft at which said coupler means is connected to said biasing means.

3. The tensioning arrangement of claim 1 wherein the torsional biasing force applied to the shaft is adjustable by varying the length of said biasing means.

4. The tensioning arrangement of claim 1 wherein said biasing means is a flat rectangular strip of spring steel.

5. The tensioning arrangement of claim 1 wherein said coupler means includes a hollow tube member adapted to be inserted into the shaft, a collar connected to said tube member for rotation therewith, said collar having a flange concentric with the shaft and overlying an exterior portion of the shaft, and locking means for selectively connecting said flange to the shaft in locking engagement.

6. The tensioning arrangement of claim 5 wherein said hub member includes an outer peripheral wall adapted to overlay said collar and a portion of the shaft.

* * * * *